INVENTORS
ROBIN K. BECKETT
WILLIAM N. BECKETT
ALLEN J. MOFFAT,
BY
J. Warren Kinney Jr.
ATTORNEY United States Patent Office 3,511,470
Patented May 12, 1970

3,511,470
NEEDLE VALVE
Robin K. Beckett, William N. Beckett, and Allen J. Moffat, Wilmington, Ohio, assignors to Beckett-Harcum Company, Wilmington, Ohio, a corporation of Ohio
Filed Feb. 12, 1968, Ser. No. 704,722
Int. Cl. F16k 5/10, 31/50
U.S. Cl. 251—121                                    1 Claim

ABSTRACT OF THE DISCLOSURE

The needle valve includes a metering stem portion or nose in which is formed an elongate fluid metering groove which extends generally lengthwise of the stem axis, said groove gradually increasing in depth in one direction. The nose may be projected predetermined distances axially through a valve seat element bore, which has such close tolerance about the nose that all fluid passed by the valve will necessarily traverse the groove, this resulting in a high velocity of fluid release which has a selfcleaning effect preventing silting. The valve seat element is self-adjusting to the stem nose, and may readily be economically replaced in the event of wear or deterioration.

---

The present invention relates to improvements in a needle valve, such as may be employed to meter a flow of fluid under pressure.

An object of the invention is to provide a needle valve incorporating improvements which greatly reduce silting, or the tendency of foreign matter to accumulate at the metering orifice and thereby partially or fully stop the flow through the valve.

Another object of the invention is to greatly enhance the reliability of a needle valve in releasing fluid at a predetermined uniform rate, without the need for frequent cleaning or replacement of parts.

Another object is to provide a needle valve construction wherein certain parts subject to wear may easily and quickly be replaced by new or reconditioned parts, in the interest of economy and serviceability of the valve.

A further object of the invention is to provide improvements in an adjustable needle valve which ensure a range of flow control from complete shut-off to a maximum flow dependent upon the capacity of the valve, with accent upon maintenance of accuracy and dependability as to the flow rate of fluid through the valve.

Another object is to provide improvements in a needle valve construction which reduce the cost of manufacture and assembly, as well as the cost of servicing when required.

The foregoing and other objects are attained by the means described herein and illustrated upon the accompanying drawing in which.

Figure 1:
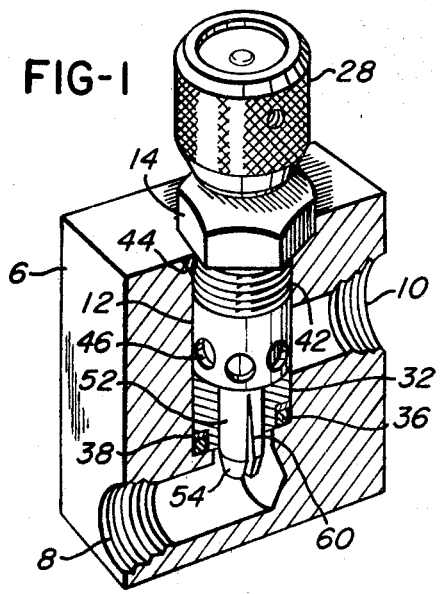
FIG. 1 is a perspective cut-away view of the needle valve, incorporating the improvements of the present invention.

In the drawing, the valve body of metal or other suitable material is denoted by reference numeral 6. It includes an inlet port 8, an outlet port 10, and a main bore or chamber 12 communicating with said ports and adapted to embrace a valving mechanism or unit for controlling flow of pressured fluid from port 8 to port 10.

The valving unit may comprise an elongate stem housing 14, having an axial bore 16 in which is shiftable a closely fitted main piston-like valve head 18 carrying an annular seal member 20. The valve head is cylindrical in form, and may be an integral part of valve stem 22 which may be manipulated exteriorly of the valve to shift valve head 18 lengthwise within bore 16. Such shifting of head 18 may be accomplished in various ways, as by means of a screw-threaded connection 24 between the stem and the reduced bore 26 of the stem housing. The stem may be rotated by means of a knob or handwheel 28 secured to the stem as by means of a set screw 30.

Figure 2:
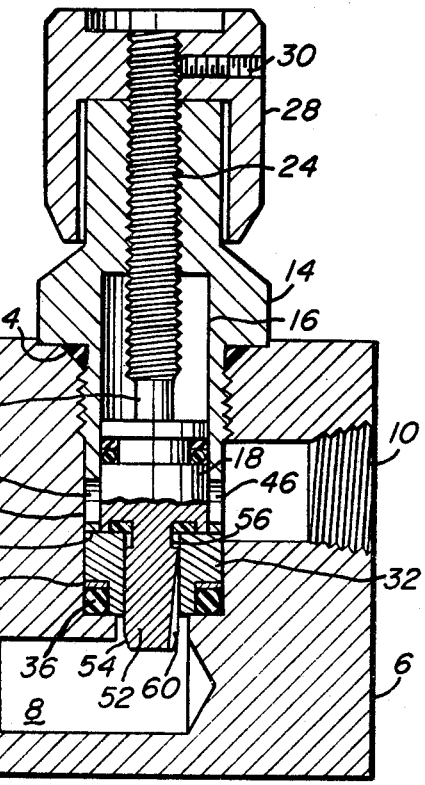
FIG. 2 is a vertical cross-section showing the valve closed.

The annular seal member 20 is movable with head 18 toward and from a valve seat element 32, which has a smooth annular contact face 34 upon which seal member 20 may seat (as in FIG. 2), to prevent passage of fluid from port 8 to port 10. Valve seat element 32 may be in the form of a hardened metal short cylinder removably fitted in bore 12, with its face 34 exposed in outlet port 10. At or near its lower end, seat element 32 may be annularly grooved to support an annular sealing ring 36 and an annular back-up ring 38, which together cooperate in preventing fluid leakage from inlet port 8 about and along the outer surface of the seat element. The sealing ring 36 of flexible material seals against the bottom of bore 12, and possibly also against the side wall of the bore. Back-up ring 38 may perform as a seal within bore 12, and may act also to preclude extrusion of the material of seal 36 into the space between bore 12 and the cylindrical wall of element 32.

The inner annular terminal end 40 of stem housing 14 bears upon valve seat element 32, at face 34, to normally hold element 32 stationary and to maintain the sealing ring 36 under leak-proof compression. Housing end 40 may be advanced onto element 32 by means of a screw threaded connection 42 between the shank of the stem housing and the interior wall of valve body bore 12. The stem housing accordingly may be unscrewed from the valve body bore to expose valve seat element 32 for easy removal and replacement when necessary. A flexible sealing ring 44 surrounding the stem housing shank, precludes leakage of fluid from outlet port 10 along the threaded connection 42.

Figure 3:
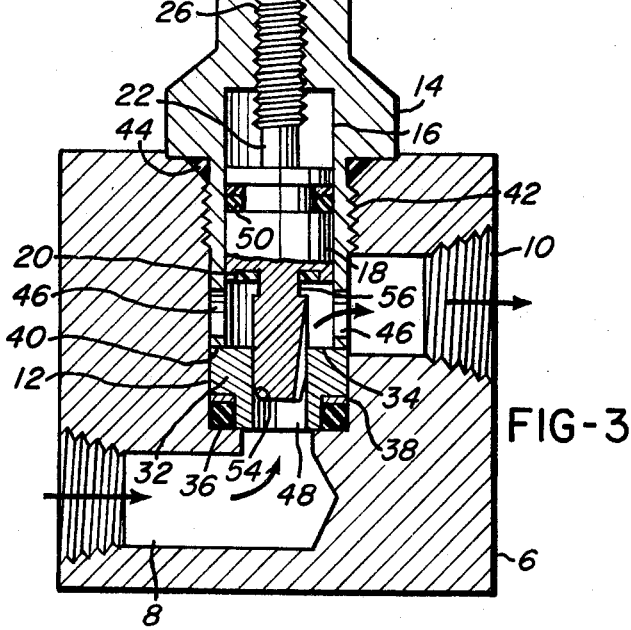
FIG. 3 is a view similar to FIG. 2, showing the valve open.

The lower portion of the stem housing shank adjacent to terminal end 40, is provided with one or more openings 46 permitting a flow of fluid from inlet port 8 to outlet port 10, through the longitudinal bore 48, when the main valve head is withdrawn from seat 34 as in FIG. 3. Said openings 46 are of course closed to passage of fluid when valve head 18 is disposed to the closed or shut-off position of FIG. 2.

Suitable sealing rings or packing means 50 may be applied circumferentially to valve head 18 as shown, to preclude upward leakage of fluid along the stem threads 24 when valve head 18 is in the unseated position of FIG. 3.

Depending from the main valve head 18, and in axial alignment therewith, is a needle member or nose 52 which projects into the axial bore 48 of valve seat element 32. The needle member or nose 52, if desired, may be an integral part of the operating stem and head 18, and will move therewith both rotationally and longitudinally as stem 22 is rotated.

The needle member or nose 52 is very closely fitted to bore 48, preferably by honing it to the bore, and is of uniform diameter throughout its effective length, which excludes the chamfered free end 54 and the reduced neck 56 adjacent to seal member 20. The bore 48 of the valve seat element 32 likewise is of uniform diameter, and has a sharp annular edge where it meets seat face 34. The clearance between the nose 52 and bore 48 may approximate .0002 inch.

The region of uniform diameter of nose 52 is provided, in its outer wall, with an elongate fluid metering passageway or groove 60 which extends generally lengthwise of the stem axis. The depth of groove or passageway 60, and consequently its cross-sectional area, increases gradually in the direction of the free end of nose or needle member 52, so that the most shallow or constricted end of the groove or passageway terminates in the outer wall, and within the region of uniform diameter of member 52, at a location remote from free end 52.

From the foregoing, the flow rate of fluid from port 8 to port 10 (in FIG. 3) will be decreased progressively as the needle member or nose 52 advances into bore 48, until at a very much advanced stage thereof, the rate of flow may be quite imperceptible. Of course, and as previously noted herein, the flow will be definitely terminated upon closing of the main valve 18-20 upon seat element 32 at 34, according to FIG. 2.

It is here noted that the very close tolerance provided in bore 48 with respect to the needle member, ensures that all fluid passing through bore 48 must necessarily travel along groove 60 rather than about the perimeter of the needle member, and as a consequence, the flow thusly confined is one characterized by high velocity which keeps the groove clear of any dirt, corrosion, or other foreign matter. This is a very important advantage attained by the means of the present invention.

Another important advantage results from providing a comparatively loose fitting of replaceable valve seat element 32 into bore 12 of the stem housing, so that element 32 may be said to have a floating mount within bore 12, permitting limited self-adjustment of element 32 laterally in the event that needle member or nose 52 is not accurately aligned with bore 48.

It is possible, and sometimes advisable, to coordinate the lead of stem thread 24 with the progressively changing depth of groove 60, and provide suitable calibrations on the knob 28 and the neck of the stem housing adjacent thereto, so that a definite metering rate may be visually indicated dependent upon the position of knob 28 relative to the stem housing.

Stem 22 could be unthreaded, if desired, so that actuation of the valve might be effected by a simple lengthwise reciprocation of the stem, rather than by a rotary movement.

What is claimed is:

1. A fluid control valve comprising in combination: a body having an inlet port, an outlet port, and an intercommunicating bore between said ports, said bore having an open end, and a bottom end having an aperture in communication with the inlet port; a seat element disposed upon the bottom end of the body bore, and having formed therein an elongate cylindrical bore in communication with said bottom aperture, said seat element having a contact face surrounding one end of said cylindrical bore remote from the inlet port; a stem housing having an outer end, and a side-apertured inner end, said inner end having an elongate smooth faced bore axially extended toward the outer end of said stem housing; means for releasably forcing the inner end of the stem housing against the seat element; an elongate valve stem having an outer end portion threaded in said housing and an inner end portion including a cylindrical elongate piston-like valve head sealingly slidable lengthwise within the bore of the stem housing; a seal on one end of the valve head movable toward and from the contact face of the seat element to preclude passage of fluid through the bore of the seat element in one position of the valve head; the outer end portion serving as means for axially shifting the valve stem and head relative to said contact face; an elongate needle member carried by and movable with said valve head and having an elongate cylindrical portion movable axially within the cylindrical bore of the seat element with close tolerances; said cylindrical portion having an elongate passageway formed therein and extended lengthwise thereof, said passageway being progressively constricted in size along its length in one direction, the most constricted end of said passageway being disposable selectively inside or outside the limits of the seat element bore incident to axial shifting of the valve stem.

References Cited

UNITED STATES PATENTS

| | | | |
|---|---|---|---|
| 2,994,343 | 8/1961 | Banks | 137—454.5 |
| 3,033,323 | 5/1962 | LaManna | 137—454.5 XR |
| 665,083 | 1/1901 | Friedmann | 251—122 |
| 1,619,937 | 3/1927 | Huff | 251—122 |
| 2,516,825 | 7/1950 | Hejduk et al. | 251—122 |
| 2,692,750 | 10/1954 | Davis et al. | 251—210 |
| 2,980,392 | 4/1961 | Greenwood | 251—205 XR |
| 3,059,894 | 10/1962 | Knecht et al. | 251—121 |
| 3,071,344 | 1/1963 | Banks | 251—210 |
| 3,187,775 | 6/1965 | Pinnell | 251—122 XR |
| 3,233,863 | 2/1966 | Bowen et al. | 251—210 |

HENRY T. KLINKSIEK, Primary Examiner

U.S. Cl. X.R.

137—454.6